United States Patent
Mottola et al.

(10) Patent No.: US 8,718,455 B2
(45) Date of Patent: May 6, 2014

(54) RADIANT SYSTEM FOR HEAT TRANSFER

(75) Inventors: Gianni Mottola, Sacile (IT); Maurizio Santin, Colle Umberto (IT)

(73) Assignee: Underleaf S.r.l., Vittorio Veneto, Treviso (IT)

( * ) Notice: Subject to any disclaimer, the term of this patent is extended or adjusted under 35 U.S.C. 154(b) by 597 days.

(21) Appl. No.: 13/013,219

(22) Filed: Jan. 25, 2011

(65) Prior Publication Data

US 2011/0182565 A1    Jul. 28, 2011

(30) Foreign Application Priority Data

Jan. 26, 2010   (IT) .............................. PN2010A0004

(51) Int. Cl.
*A45D 20/40*   (2006.01)
*F24C 7/00*    (2006.01)

(52) U.S. Cl.
USPC ........... 392/407; 392/432; 392/438; 392/439; 219/468.1; 219/548

(58) Field of Classification Search
None
See application file for complete search history.

(56) References Cited

U.S. PATENT DOCUMENTS

| | | | | |
|---|---|---|---|---|
| 3,069,522 A | * | 12/1962 | Jamison | 219/544 |
| 3,626,149 A | * | 12/1971 | Carney et al. | 219/213 |
| 3,781,527 A | * | 12/1973 | Tymczak | 219/540 |
| 4,241,782 A | * | 12/1980 | Schoenfelder | 165/10 |
| 4,564,745 A | * | 1/1986 | Deschenes | 219/213 |
| 5,237,155 A | * | 8/1993 | Hill | 219/544 |
| RE43,044 E | * | 12/2011 | Zaleski et al. | 404/31 |
| 2005/0105968 A1 | * | 5/2005 | Smith | 404/34 |
| 2011/0173909 A1 | * | 7/2011 | Viau et al. | 52/302.1 |
| 2011/0253694 A1 | * | 10/2011 | Consiglio | 219/213 |

FOREIGN PATENT DOCUMENTS

| | | |
|---|---|---|
| DE | 4208625 | 9/1993 |
| DE | 9319245 | 2/1994 |
| DE | 20320181 | 5/2004 |
| EP | 1921388 | 5/2008 |
| EP | 2034797 | 3/2009 |

* cited by examiner

*Primary Examiner* — Thor Campbell
(74) *Attorney, Agent, or Firm* — Shoemaker and Mattare

(57) ABSTRACT

A radiant heating system includes a molded agglomeration of inert natural stone waste and a heating element embedded in the agglomeration. The agglomeration contains 45-55% by weight of stone particles having a size from 1 to 5 mm; 30-35% by weight of stone dust having a size from 0.01 mm to 0.5 mm; and 20-25% by weight of a resin having a water-based acrylic component.

10 Claims, 4 Drawing Sheets

RADIANT SYSTEM FOR HEAT TRANSFER

This application claims priority under 35 USC 119 from Italian patent application PN2010A000004, filed Jan. 26, 2010, which is incorporated herein by reference.

BACKGROUND OF THE INVENTION

1. Field of Invention

The present invention relates to a system for the radiant heat transfer and/or accumulation of heat in a room for domestic, industrial, civil or public use. The radiant system includes an agglomeration of inert natural stone waste, and a heating element is embedded in the agglomeration. The shape of the heat radiant system is defined by a mold in which the agglomeration is cast with the heating elements.

2. Prior Art

At present, the problem of accumulating and/or transferring heat to the environment is solved in different ways, depending on the type of heating. With electric heating elements, the component that transfers heat to the environment can be either metal or stone, the latter being suitable for dry convection heating. For hydraulic systems, where heat is generated upstream through a gas boiler, the type of heating elements or radiators are usually metal (steel, aluminum and in the past iron).

In the case of dry electric heating, the heat energy produced by the Joule effect by a heating element is gradually transferred to the environment using a slab of a natural stone. Such elements are made from natural stone quarries where blocks of material are extracted for further processing. The extraction of the stone leads to the defacement of the area, with serious consequences in terms of landscape and environment.

To increase aesthetic value, using present techniques, ceramic tiles are also used (surface and molded sheets) for the accumulating and transferring heat in electric and hydraulic elements.

Examples of such applications are disclosed in EP 2034797 A2, which describes the use of ceramic materials, sandwiched with the heating element, and EP 1921388 A1, in which a layer of ceramic material is coupled with a heating element through a layer of metal and polymers to enhance the properties of thermal coupling.

According to the first finding, the coupling between the heating elements and radiant body does not involve the entire surface of the heating element. The thermal coupling between the bodies with stone and/or ceramic heating elements and is often rough and loss of performance in the transfer of heat to the environment.

FIG. 1 shows a sectional view of the heat coupling between a stone and the heating element 2. The uneven surface of the stone does not allow the heating element to remain perfectly adherent. One can see the heating element 2 that has no direct thermal contact. This condition increases the temperature of the heating element and affects the heating element lifetime. The resulting surface temperature of the body of radiation emission is reduced.

In the second finding, the coupling between the ceramic front and the heating elements (electrical resistance) is made of a compound of metallic and polymeric materials which carry an adhesive for the heating element. In this case there is an improvement in heat transfer but the front element (which transmits the heat) and heating element are still separated. The final system is made so it is difficult to recycle.

In all these conditions, where the elements that generate and transmit the heat detached from the radiating body, there are a number of disadvantages summarized below:

thermal coupling and the resulting transfer of heat to the environment is not optimized;

assembly between the heating elements and radiant body is often made with glues or chemicals, not easily separable and recyclable, made by non eco-friendly chemical processes.

is difficult to reduce the thickness and size of the complete system made by the body and radiant heating element that generates heat.

Conventionally, in the case of heating elements where heat is transported to the surface emission from a carrier fluid (radiator fluid), the heating element receives heat by convection. The latter involves non-uniform surface temperatures and the transfer of heat to the environment is mainly due to convection.

FIG. 2 shows an electric radiator fluid cross-section. The heating element 3 receives heat by convection of the fluid inside the radiator 4 due to the heating element 5. Outside of the radiator, due to the non-uniform surface temperatures, convective air phenomena are established immediately adjacent to the radiator. Temperatures at the top are higher than in the lower part, this phenomena reduces the radiant effect.

The main current technical innovations in heating took place in recent years to reduce consumption, and to provide a more healthy system by reducing the components that reduce the convective rising of dust. The under-floor heating system on the market is an example, allowing the use of techniques of heating at low temperature due to radiation, combined with efficient power generation systems, such as condensing gas boilers. These systems have the disadvantage of being very complex to install (and thus also the initial investment is still high), and given the enormous heat capacity of the floors where they are incorporated, usually this means an increase complexity in the regulation of ambient temperature.

The heating market needs solutions that improve heat transfer between heating panels and the environment, solutions that are advantageous with respect to cost and to aesthetic value, that are sustainable from an environmental and recycling prospective, and where the production of the appliance is a sustainable and eco-friendly process.

SUMMARY OF THE INVENTION

The present invention provides a radiant system which can be designed for environment and room heating, in which the main component for the transfer of radiant heat to the environment is made using inert materials from the waste products of natural stone. The radiator, through the construction process, described below, is made of recycled inert materials, deriving from the processing waste of natural stone and contains the heating element that generates heat within. The heating elements can be electrically powered (electrical heating elements) or can be transferred by pipes which transport the liquid heated elsewhere. The result is a single body, which includes the radiant system, the heating element, and any heat sinks, to increase the heat transfer and elements to measure and control temperature for the security of the device.

DESCRIPTION OF THE PREFERRED EMBODIMENT

Figure 1:
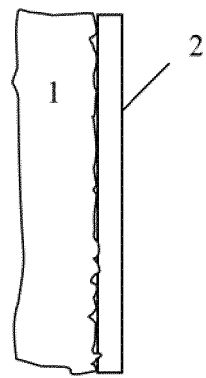
FIG. 1 shows a prior art solution with non-optimal coupling between a radiator and a heating element.
Figure 2:
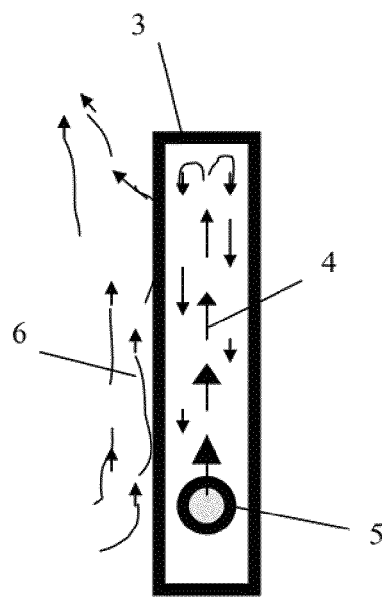
FIG. 2 shows predominately convective heating fluid on radiators with metal components.
Figure 3:
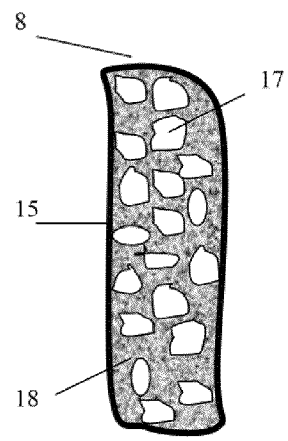
FIG. 3 shows agglomerated material for a radiator.

The heating element shown in FIG. 3 is composed of aggregates with the following composition:
- 45 to 55% by weight particulate waste stone products sized from 1 to 5 mm;
- 30 to 35% by weight stone powder with size from 0.01 mm to 0.5 mm;
- 20 to 25% resin by weight with water-based acrylic component.

FIG. 3 shows a heating body 8 with the composition described above, highlighting the components: particulate waste 17 of stone, stone powder 18, the radiating surface 15.

The radiant system 7 is constructed in four phases:

Phase 1: Preparation of Agglomeration

At this stage the three basic components are mixed in a mixture with water to prepare a batch. This mixture has the characteristic of being not solid, having low viscosity and being castable in various shapes and molds. In this phase other components such as fiberglass can also be added to increase the mechanical strength of the compound.

Phase 2: Casting Mold

The product is poured into a silicone mold that allows the filling and shape. At this stage, the liquid and fine powder, made from the resin combined with the water, settles in the mold, covering the visible surface of the body. This condition allows at the end of the process to obtain the surface in sight with a huge reproduction of detail in printed form. Natural pigments can also be added to the surface of the mold before the casting. The process allows one to realistically simulate different types of natural stone, reproducing the grain and other typical effects of a natural material.

Step 3: Immersion of Heating Element in the Agglomeration

The heating element 9 (for the case of electric heating) or 20 (in the case of fluid heating) is immersed within the agglomeration in whole or in part, while the agglomeration is not in a solid state. In order to prevent the deposition of the heater elements in the visible parts on the front, spacers can be placed in the bottom of the mold.

The construction allows an excellent adhesion of the heating element to the agglomeration components. The powder component of the agglomerate fills in, covering the cracks and imperfections in the heating element, promoting better heat transfer by conduction.

Step 4: Aging

The heating system is left to dry in a cool, dry environment in order to facilitate the dehydration of the agglomerate. After twelve hours the product can be released from the mold for subsequent maturation. At the end of this phase, the aqueous component is no longer present in the radiating system, and the end product is compact, single-bodied and mechanically resistant.

It is worth noting that in all these phases of the production process, no chemical agents are used for pickling, for treating or processing of materials, that need care and attention for disposal. There is no use of complex equipment such as high-temperature ovens, fossil fuels or wasting energy for drying (i.e., the process is cold).

Figure 4:
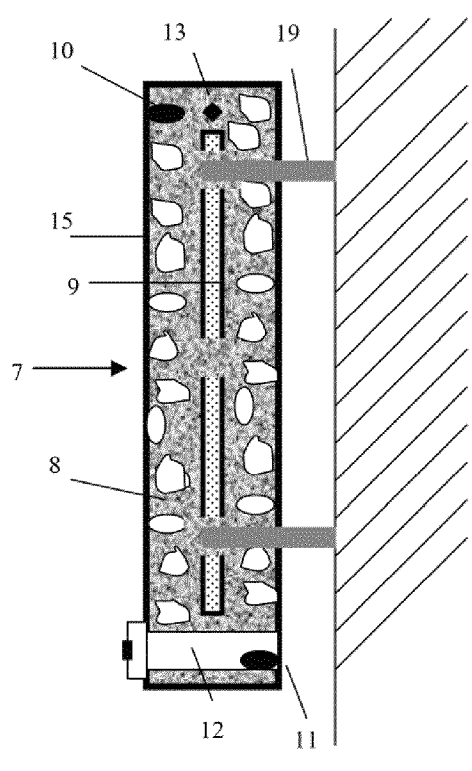
FIG. 4 is a sectional view radiant system, showing particle aggregates, an electric heater, controls and safety devices incorporated.
Figure 5:
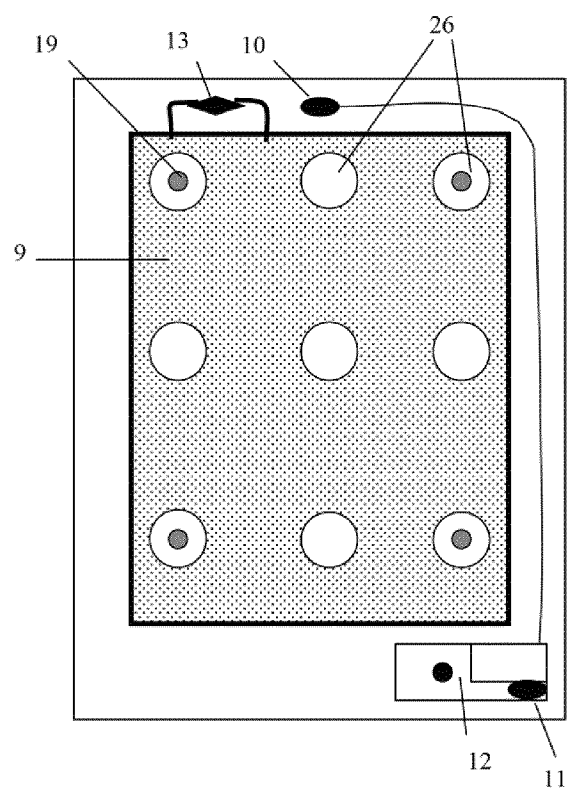
FIG. 5 is a side view of the system shown in FIG. 4.

FIGS. 4 and 5 show a preferred implementation of the radiant system with a view in section 7, where the radiant system is composed of a heating unit 8, an agglomeration of inert material, a preferably electric heating element 9, possibly elements for measuring the temperature of the radiator 10, temperature measuring elements 11, a temperature control 12 and an electrical safety element 13.

In this embodiment, the heating element 9 is controlled by an electronic control through a power switch. The control 12 measures the temperature using the temperature sensor 11 and based on the user's settings to a desired temperature, regulates the resistance heating power.

The electric heating element 9 is, preferably, a flat surface element with perforations 26. These are needed to connect the front of the radiator 8 with the rear. Thus, the heating system 7, as a whole, is compact and mechanically robust. The distribution of the holes on the surface of heating unit 9 is uniform. The sum of the areas covered by the holes 26 is at least 15% of the total surface area of the heating element 9.

The position sensor 11 is chosen to minimize the influence of the heat produced by the system on the measurement of temperature. The sensor is placed lower than the radiant system in the back, facing the wall where the system is installed, but remaining preferably inside the control 12.

In the front, high on the system, is the temperature sensor 10 that measures the temperature of the radiator. The component of radiation is directly dependent on the temperature, which can be controlled with the electronics 11.

The sensor 10 allows the electronic control to accurately measure the surface temperature of the body and limit the temperature, which is useful when the use of these radiant systems is in environments frequented by children, e.g., in kindergartens and hospitals. In all these cases, the surface temperature of the radiant system can be restricted or controlled by the control system 12 to ensure higher standards of safety.

The wall brackets 19 are embedded in the agglomeration 8 and allow the installation of the system on a wall. The position of the brackets 19, which are preferably metallic, is in line with the center of the holes 26, so as to allow a safe distance between the electrically active parts of the heating element 9 and the metal part of the support bracket 19, accessible from outside the device.

Figure 6:
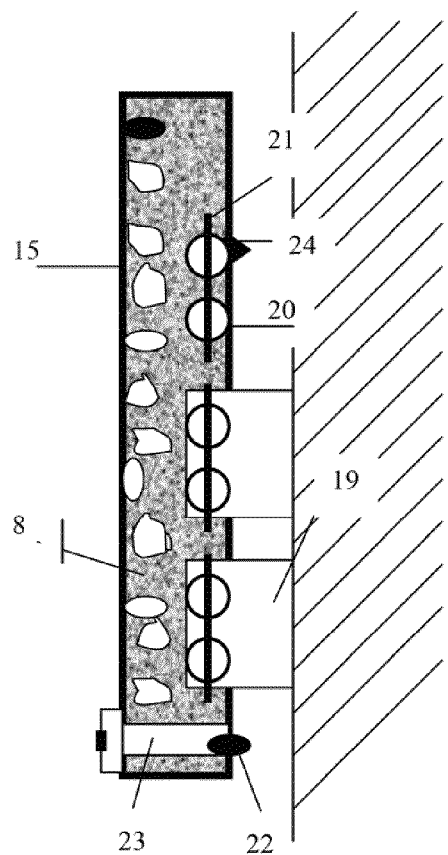
FIG. 6 is a sectional view of an alternative embodiment of the system.
Figure 7:
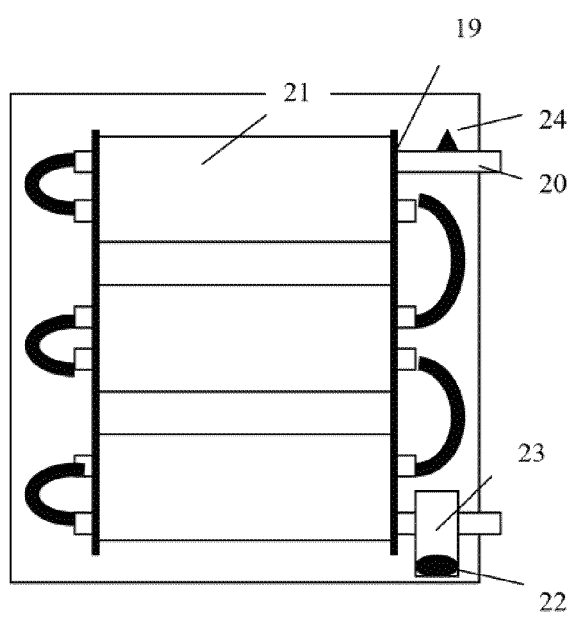
FIG. 7 is a side view thereof, showing particle aggregates and connections of ducts for heating fluid controls and safety devices incorporated.

FIGS. 6 and 7 show a different embodiment of the radiant system, comprising an agglomeration of inert compound 8, a heating element in tubular tubes 20, in which is fixed a metallic heat sink 21 to increase the thermal conductivity of the radiator (all incorporated inside of the radiator), a temperature measuring element 22 and/or temperature control 23 by way of flow control, and a security element 24 (e.g. an overpressure valve) built into the radiator.

In this embodiment, the fluid that transports heat flows through the tubes 20, yielding the optimal heat to radiator using the heat sinks 21. The radiator 8 contains integrated brackets 19 to fix the heating system 7 on the wall; the brackets are fastened on the tubular conduits 20. The brackets 19 are joined together to ensure the flatness of the tube and correct positioning during the placement process.

Figure 8:
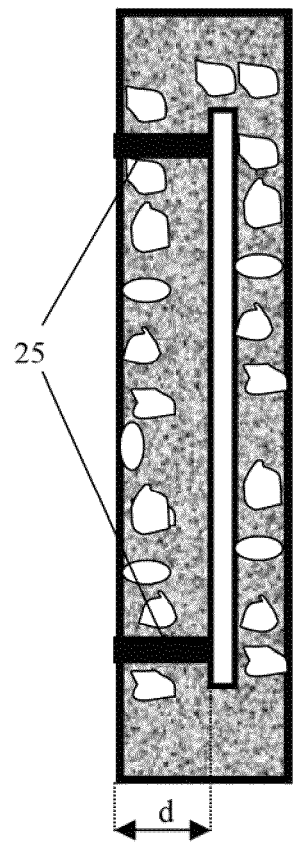
FIG. 8 shows the positioning of heating element with the spacers.

Referring to FIG. 8, showing the heating system 7 in cross-section, the position of the elements 9 (electrical heating element) or 20 (the tubular heating fluid) inside the heating system, than the radiating surface 15, affects the process of heating temperatures: the larger the distance between the surface and heating element, the greater the thermal inertia. To control the dynamics by which the surface temperature increases in the radiant system 7, and then change the thermal inertia of the system, it is possible to predetermine the distance d. The distance d is defined during the construction process by means of spacers 25 inserted within the agglomeration 8. By changing the distance d, it is also possible to define which of the surfaces has a higher temperature. If the heating element 9 or 20 is moved toward the radiating surface 15, reducing the distance d, the surface temperatures increase, conversely, increasing d reduces the temperature of the radiating surface 15, but increases the temperature of the surface facing the wall. In the latter condition, the convective phenomenon of the hidden surface compensates for the reduction of radiation. The parameter d thus determines the balance between rear convective heating and front radiating effect.

Through the optimal thermal coupling between the heating element heat source (in which the generation can be a fluid or electric) and the surface emissivity, important benefits are obtained for space heating, such as:
- better transfer of heat from the heating surface emissivity, heat capacity and increased ability to keep the temperature much longer than the radiator fluid;
- integration between the heating element (which generates heat) and heating unit allows the reduction in volume and in particular the thickness of the radiating system.
- uniformity best temperature of the surface emissivity;
- the possibility of different finishes, complex shapes can be reproduced easily.

We claim:

1. A radiant heating system for transferring and/or accumulating heat in an environment, said system comprising an agglomeration of inert natural stone waste and a heating element embedded in the agglomeration, wherein the agglomeration is composed of aggregates with the following composition:
   - 45-55% by weight of stone particles having a size from 1 to 5 mm;
   - 30-35% by weight of stone dust having a size from 0.01 mm to 0.5 mm; and
   - 20-25% by weight of a resin having a water-based acrylic component.

2. A method of making a radiant heating system according to claim 1, said method comprising the following steps in sequence:
   - preparing an agglomeration by mixing the stone particles, the stone dust, and the resin with water to prepare an agglomeration;
   - casting the agglomeration in a mold;
   - embedding a heating element and optionally temperature control and measuring elements in the agglomeration while the agglomeration is a not solid phase; and
   - aging in a dry environment to dehydrate the agglomeration.

3. A radiant heating system for transferring and/or accumulating heat in an environment, said system comprising an agglomeration of inert natural stone waste and a heating element embedded in the agglomeration, wherein the agglomeration is composed of aggregates with the following composition:
   - 45-55% by weight of stone particles having a size from 1 to 5 mm;
   - 30-35% by weight of stone dust having a size from 0.01 mm to 0.5 mm; and
   - 20-25% by weight of a resin having a water-based acrylic component, wherein the heating element is an electrical plate, having a surface which has holes, the sum of the areas of the holes being at least 15% of the surface of the heating element.

4. A radiant heating system according to claim 3, wherein the agglomeration is integrated within a temperature control located on a lower side of the radiating system, a temperature sensor for measuring the radiating surface located at the top of the radiating system, and, on the front of the radiating system, components and circuits for controlling and regulating the temperature of the heating element with a power switch and limit the temperature of the radiating surface.

5. A radiant heating system according to claim 3, further comprising an electromechanical or electrical safety switch such as a fuse or thermostat integrated in the agglomeration.

6. A radiant heating system, according to claim 3, further comprising brackets for attaching the radiating system, said brackets being integrated in the agglomeration and centered with the center axis of said holes, so as to allow an adequate safety distance between live parts of the electrical heating element and the metal part of the accessible mounting bracket.

7. A radiant heating system according to claim 1, wherein the heating element includes a tubular heating element for conducting heating water within the agglomeration body, and a heat sink on the tubular heating element to increase the thermal conductivity to the agglomeration body.

8. A radiant heating system according to claim 7, further comprising a temperature measuring element and/or water flow control, and an over pressure valve integrated in the agglomeration body.

9. A radiant heating system according to claim 7, further comprising brackets for fixing the system, said brackets being connected to the tubular elements within the agglomeration, said brackets being joined together to maintain alignment of said tubular elements during the production process.

10. A radiant heating system, according to claim 1, wherein the distance from the heating element inside the heating system to the radiating surface is maintained at a predetermined distance by spacers inserted inside the agglomeration, whereby, by changing said predetermined distance, one can change the thermal inertia of the system and determine which of the front or rear surfaces of the system has the higher temperature.

* * * * *